US012700287B2

(12) United States Patent

Nelson et al.

(10) Patent No.: US 12,700,287 B2

(45) Date of Patent: Aug. 4, 2026

(54) VIRTUAL REALITY MOTION SPORTS WAGERING

(71) Applicant: IGT, Las Vegas, NV (US)

(72) Inventors: Dwayne Nelson, Las Vegas, NV (US); Kevin Remus, Las Vegas, NV (US)

(73) Assignee: IGT, Las Vegas, NV (US)

( * ) Notice: Subject to any disclaimer, the term of this patent is extended or adjusted under 35 U.S.C. 154(b) by 333 days.

(21) Appl. No.: 18/336,296

(22) Filed: Jun. 16, 2023

(65) Prior Publication Data

US 2024/0420549 A1      Dec. 19, 2024

(51) Int. Cl.
| | |
|---|---|
| *A63F 9/24* | (2006.01) |
| *A63F 11/00* | (2006.01) |
| *G06F 3/01* | (2006.01) |
| *G06F 13/00* | (2006.01) |
| *G06F 17/00* | (2019.01) |
| *G06V 20/40* | (2022.01) |
| *G06V 40/20* | (2022.01) |
| *G07F 17/32* | (2006.01) |

(52) U.S. Cl.
CPC .......... *G07F 17/3288* (2013.01); *G06F 3/011* (2013.01); *G06V 20/44* (2022.01); *G06V 40/20* (2022.01); *G07F 17/3211* (2013.01); *G07F 17/3223* (2013.01); *G07F 17/323* (2013.01)

(58) Field of Classification Search
CPC ... G07F 17/32; G07F 17/3214; G07F 17/3222
USPC .............................. 463/1, 20, 22, 25, 30, 39
See application file for complete search history.

(56) References Cited

U.S. PATENT DOCUMENTS

| | | | | |
|---|---|---|---|---|
| 6,607,443 | B1 * | 8/2003 | Miyamoto .......... | G07F 17/3209 |
| | | | | 463/40 |
| 12,354,432 | B2 * | 7/2025 | Alderucci ........... | G07F 17/3209 |
| 2008/0146344 | A1 * | 6/2008 | Rowe ...................... | G07F 17/32 |
| | | | | 463/42 |
| 2012/0315987 | A1 * | 12/2012 | Walling ................ | A63F 13/211 |
| | | | | 463/31 |
| 2013/0271602 | A1 * | 10/2013 | Bentley ................... | G06T 7/215 |
| | | | | 348/143 |
| 2017/0090554 | A1 * | 3/2017 | Pececnik ............. | G07F 17/3206 |
| 2021/0370133 | A1 * | 12/2021 | LaPoint ............. | A63B 24/0021 |
| 2024/0198227 | A1 * | 6/2024 | Watanabe .............. | A63F 13/87 |

\* cited by examiner

*Primary Examiner* — Adetokunbo O Torimiro
(74) *Attorney, Agent, or Firm* — Sheridan Ross P.C.

(57) ABSTRACT

A system includes a communication interface, a processing circuit, and a memory coupled to the processing circuit. The memory includes machine readable instructions that, when executed by the processing circuit, cause the processing circuit to receive participant motion data and event data that corresponds to a defined occurrence in a sporting event that is predicted to happen during the sporting event. The processing circuit is further caused to send an event wagering opportunity corresponding to the defined occurrence in the sporting event and receive, before the defined occurrence in the sporting event, predicted motion data and a wagering amount that corresponds to the event wagering opportunity before the defined occurrence in the sporting event. The processing circuit is further caused to determine an award level that is based on comparing the predicted motion data and an actual outcome of the defined occurrence of the sporting event.

19 Claims, 12 Drawing Sheets

200E

105

100"

116'

152

127

128

136

138

130

140

502

500

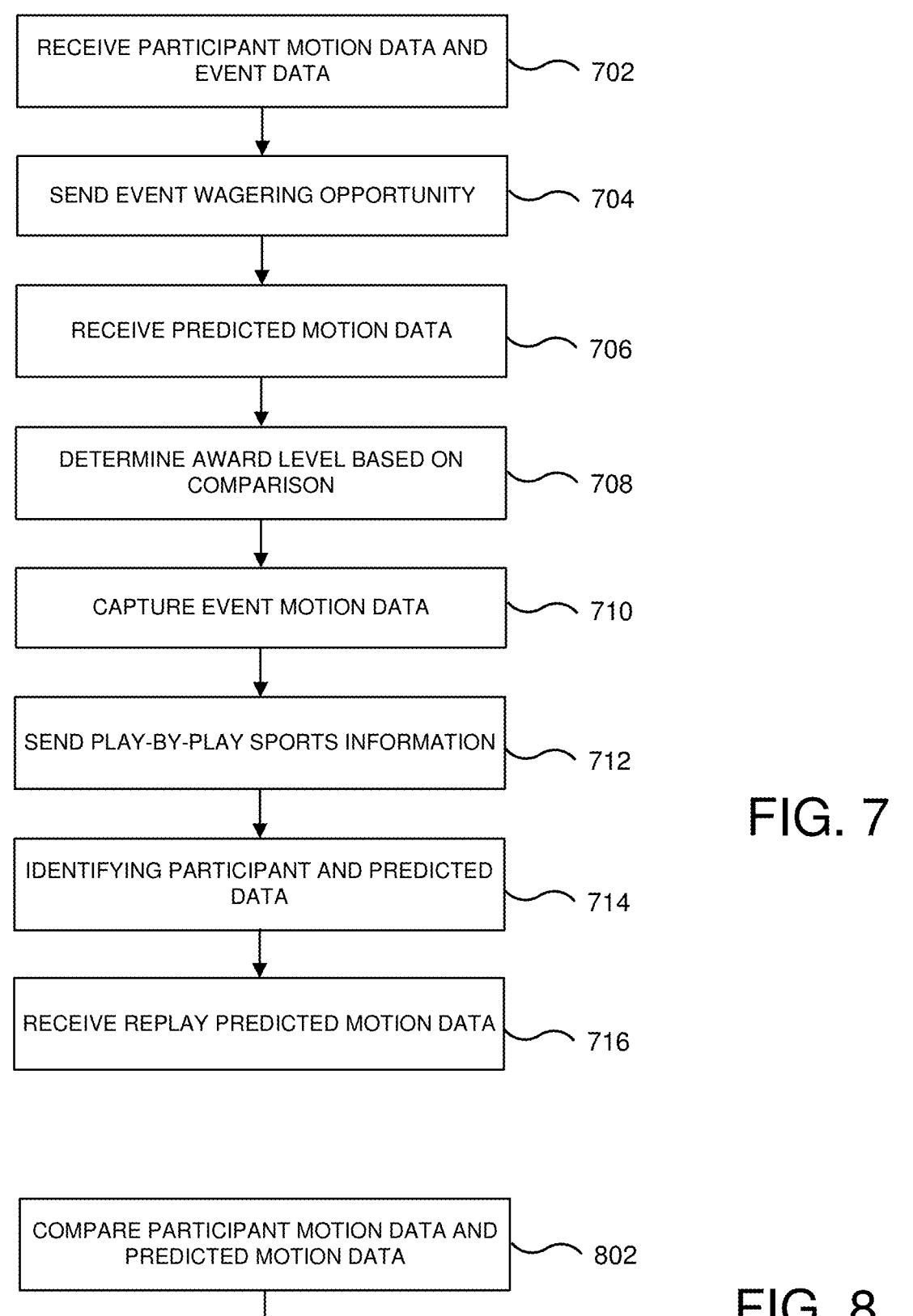

RECEIVE PARTICIPANT MOTION DATA AND EVENT DATA — 702

SEND EVENT WAGERING OPPORTUNITY — 704

RECEIVE PREDICTED MOTION DATA — 706

DETERMINE AWARD LEVEL BASED ON COMPARISON — 708

CAPTURE EVENT MOTION DATA — 710

SEND PLAY-BY-PLAY SPORTS INFORMATION — 712

IDENTIFYING PARTICIPANT AND PREDICTED DATA — 714

RECEIVE REPLAY PREDICTED MOTION DATA — 716

FIG. 7

COMPARE PARTICIPANT MOTION DATA AND PREDICTED MOTION DATA — 802

DETERMINE AN AWARD LEVEL BASED ON COMPARISON — 804

FIG. 8

VIRTUAL REALITY MOTION SPORTS WAGERING

BACKGROUND

Embodiments described herein relate to virtual reality systems and methods.

Gaming devices, such as electronic gaming machines (EGMs) and/or other wagering terminals may be capable of attracting players based on access to sports wagering opportunities. Such access may provide enjoyment that may be limited to actual outcomes of sporting events. Increasing wagering opportunities and interfaces may provide increased interest in wagering.

BRIEF SUMMARY

Embodiments herein are directed to systems that include a communication interface, a processing circuit, and a memory coupled to the processing circuit. The memory may include machine readable instructions that, when executed by the processing circuit, cause the processing circuit to perform operations described herein. The processing circuit is caused to receive, from a sporting event server, participant motion data and event data that corresponds to a defined occurrence in a sporting event that is predicted to happen during the sporting event, send, to a customer device, an event wagering opportunity corresponding to the defined occurrence in the sporting event, and receive, from the customer device and before the defined occurrence in the sporting event, predicted motion data and a wagering amount that corresponds to the event wagering opportunity before the defined occurrence in the sporting event. The processing circuit is further caused to determine, after the defined occurrence in the sporting event, an award level that is based on comparing the predicted motion data and an actual outcome of the defined occurrence of the sporting event.

Some embodiments are directed to methods that include operations of receiving, from a sporting event server, participant motion data and event data that corresponds to a defined occurrence in a sporting event that is predicted to happen during the sporting event, sending, to a customer device, an event wagering opportunity corresponding to predefined occurrence in the sporting event, and receiving, from the customer device and before the defined occurrence in the sporting event, predicted motion data and a wagering amount that corresponds to the event wagering opportunity before the defined occurrence in the sporting event. Operations may include determining, after the defined occurrence in the sporting event, an award level that is based on comparing the predicted motion data and an actual outcome of the defined occurrence of the sporting event. In some embodiments, the predicted motion data includes actual body movements of a customer and a corresponding input provided via a user interface. Some embodiments provide that the processing circuit is further caused to send play by play sports information to the customer device for the customer to use in determining a wager.

Some embodiments are directed to a system that includes a processing circuit and a memory coupled to the processing circuit. The memory includes machine readable instructions that, when executed by the processing circuit, cause the processing circuit to perform operations of comparing participant motion data and predicted motion data corresponding to event data that corresponds to a defined occurrence in a sporting event and determining, after the defined occurrence in the sporting event, an award level that is based on comparing the predicted motion and an actual outcome of the defined occurrence of the sporting event. In some embodiments, the participant motion data and event data are generated in a sporting event server based on a plurality of sensors that are worn by a participant in the sporting event.

BRIEF DESCRIPTION OF SEVERAL VIEWS OF THE DRAWINGS

FIG. 7 is a flowchart illustrating operations of systems/methods according to some embodiments.

FIG. 8 is a flowchart illustrating operations of systems/methods including a sporting event server according to some embodiments.

DETAILED DESCRIPTION

It may be advantageous to allow customers to place wagers on a sporting match event ("micro wagering") using Virtual Reality (VR) and/or Augmented Reality (AR) motion capture. Some embodiments provide that the customer is able to use their VR and/or AR device to predict or replay the motions of a sporting play, such as a pitch of the ball in baseball or a down in football. If the customer is able to accurately predict the motions of one or more players using the AR and/or VR, the player may win the wager. While discussed herein in terms of the VR and/or AR devices, embodiments may provide that systems may include a VR device and not an AR device or an AR device without a VR device. While VR and/or AR may be futuristic, some embodiments herein may be provided without a VR and/or AR device. In some embodiments, a VR device and/or an AR device may be a mobile device that may include an application that provides virtual reality and/or an augmented reality.

Figure 5:
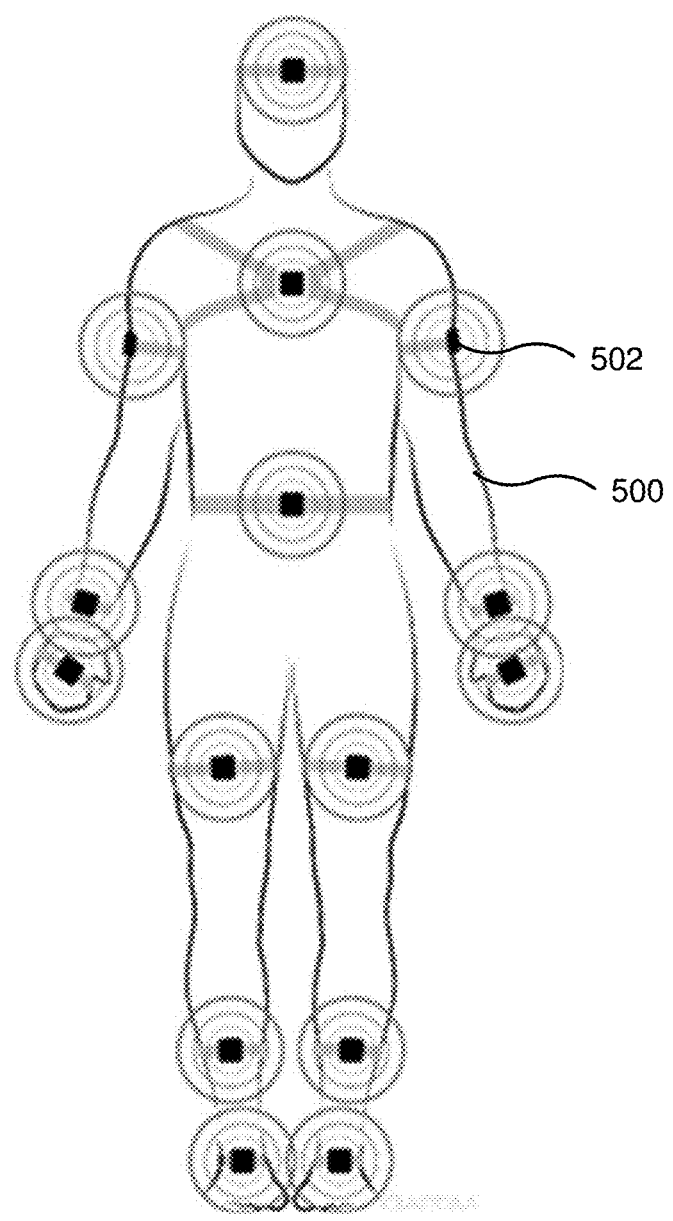
FIG. 5 is a schematic cross-section of a human body shape 500 with example sensors 502 according to some embodiments herein.

In some embodiments, the detailed motions of athletes may be known. Some embodiments provide that the motion of the athletes, including hand, arm, and/or leg motion details may be captured during live sporting events. This motion information may be gathered from sensors worn by the athletes. For example, brief reference is made to FIG. 5, which is a schematic cross-section of a human body form 500 with example sensors 502 according to some embodiments herein. Such sensors may include shirt, shoe, helmet and/or body sensors, among others. In some embodiments, the motion information may be alternately and/or additionally captured from video cameras of the live sporting event. Some embodiments provide that based on the video data, the detailed body motion can be determined for each player during the entirety of the match.

Embodiments may further provide that the motion capture and recording of other relevant aspects of the game may be recorded such as the ball, the referees, the conditions of the field, the hockey puck, the baseball ball, gloves, poles, stands, and/or barriers, among others.

Similarly, a customer may be using a VR and/or AR device at home or in some other location. In some embodiments, the VR and/or AR device may be able to capture the customer body motions. The VR and/or AR device may also include buttons and/or joysticks for virtually moving around the environment. In some embodiments, the customer is the person who will be placing wagers on the sporting event.

As provided herein, wagering may be performed by predicting exact body motions. In some embodiments, the captured body motion of athletes and customers may be leveraged. Embodiments may further provide an "in game wagering" and/or "micro wagering" feature for sports betting. Some embodiments include micro wagering that allows customers to wager on individual events rather than entire matches. For example, a customer might wager on the next pitch in baseball (strike, hit or ball) or on the next play in football (will it be a run, pass and how many yards gained or lost?).

Figure 6:
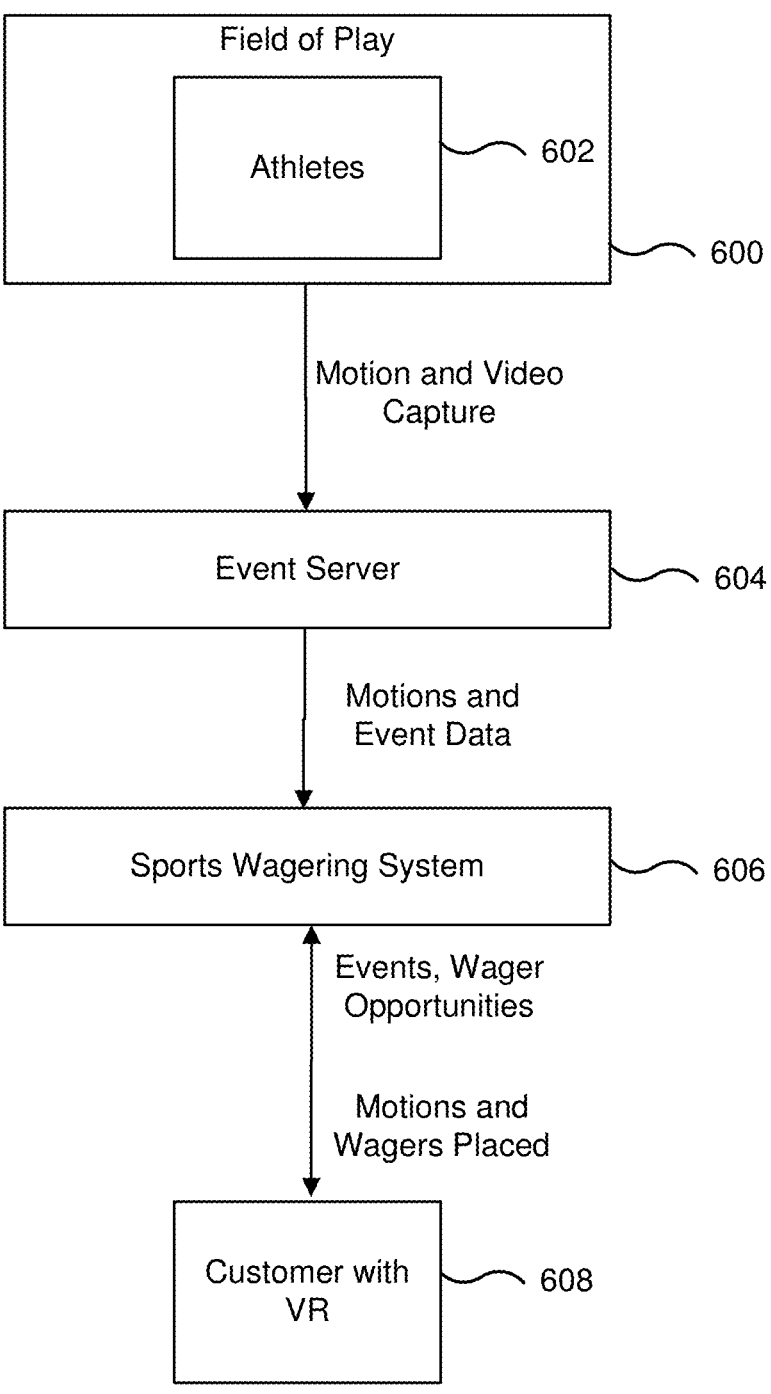
FIG. 6 is a schematic block diagram of a system for providing VR motion sports betting according to some embodiments herein.

Brief reference is now made to FIG. 6, which is a schematic block diagram of a system for providing VR motion sports betting according to some embodiments herein. The system may capture motion and video data corresponding to an athlete 602 in a field of play 600. The captured motion and video data may be sent to an event server 604. The event server 604 may analyze the received motion and video capture data.

In some embodiments, the event server 604 may convert video data to motion data, capture 3D models of athletes, and record the state of the game such as the current play, score, down, inning, etc. The event server 604 may send this information to a sports wagering system 606. The sports wagering system 606 may distribute the play-by-play information to the customer with VR 608. It also sends the customer the wagering opportunities including the micro wagering opportunities. In some embodiments, the customers 608 may see this information on a mobile device, personal computer and/or a sports wagering kiosk among others. Some embodiments provide that the customer 608 is using a VR and/or AR device. The customer 608 is able to place wagers and send body motions for those wagers to the sports wagering system 606.

In some embodiments, the customer 608 places a wager with the sports wagering system 606 using a VR and/or AR device. The customer 608 may be able to wager a certain amount of money and provide a body motion that he/she believes will closely match the outcome of the micro wager. For example, a first customer places a $5 wager on the next play of the football game. The first customer uses his VR and/or AR device to record the body motion that he/she believes will happen. The first customer may record himself in 3D spaces running ahead 10 yards and virtually catching a ball. The first customer wagers that this will happen on the next play. If the next play has a player run ten yards ahead and catch the ball like the first customer predicted, then the first customer will be awarded a win payment. Other variations of this wagering may be provided as described herein.

In some embodiments, in addition to recording the wager and the body motion, the customer 608 may also select one or more specific players that they believe will perform the action.

Some embodiments herein may allow for pari-mutuel wagering (a.k.a. "pool betting"), such that the customers 608 are playing against each other instead or and/or playing against a wagering system operator. In some embodiments, all customers 608 place their wagers and provide body motion data and the top portion of customers may be awarded a prize. In some embodiments, the prizes are awarded in descending prize amounts. Some embodiments provide that the operator (i.e., the house) may take a small amount of the total wagers placed.

Some embodiments may evaluate the customer body motions against the captured motions of the athletes for each play and/or for each wager. Embodiments may identify the closest match to the actual outcome of the event to determine the winner(s).

Embodiments may compare multiple aspects of the motion capture including final destination/position of the player, position over time which may be how the customer body compares each moment in time over the play. For example, in a 10 second play the customer 608 might not closely match the position of the athlete for 3 seconds but may catch up on the 4th second. In this regard, how many of a plurality of time units in a time interval that were correct may be used to determine motion aspects.

Aspects of the motion capture may further include motion of hands or fingers. For example, the hands must be up to catch the ball or the hands must intersect with the ball to catch it. Motion capture may also include motion of feet or legs.

Some embodiments may use one or more of the above aspects in a weighted fashion. In one example weighting, embodiments may value being int the right position to catch the ball more than the exact position of the arms or hands. These weightings may vary per sport and/or per micro wager. For example, the exact foot position is likely important in soccer for a penalty kick but not in baseball for a batter at home plate.

In some embodiments a VR and/or AR system of the customer 608 may include a prop with additional motion capture. For example, the customer 608 might hold a physical bat in their hands during the VR capture and the exact position, speed, angle and/or velocity of the bat may be used just the like parameters of the body to determine how well the customer matched the athlete.

Some embodiments provide that events may be replayed to attempt to gain a better outcome. Some embodiments provide that such features may be used for wagering and/or for mere social benefit. The customer 608 is allowed to "replay" an event and attempt to do better than or similar to the actual outcome. For example, in the play of a football game, the wide receiver runs 10 yards out at a 45 degree angle, attempts to catch the ball, but fails and drops the ball. The customer 608 may choose to replay this event as the wide receiver. The customer 608 may use his VR and/or AR device to run 10 yards out, at a 45-degree angle and may successfully attempt to catch the ball. The customer 608 may wager on this ability. In some embodiments, the customer may also share this captured event with his friends on social media. In some embodiments, the customer 608 may share the video of his successful catch and text such as ("Look who DIDN'T drop the ball").

The video captured is a 3D rendering of the event using the motion capture of the athletes and the customer 608. In some embodiments, the video captured replaces the athlete with the customer's avatar. For example, in some embodiments, the wide receiver may be replaced with an avatar that looks like the customer and may have a football jersey with the customer's name on it and with the customer's favorite number "14". In some embodiments, the actual wide receiver may be used in the video but using the customer's winning motion capture.

In some embodiments the customer 608 may place a wager that he is able to achieve a certain outcome when the event is replayed. For example, some embodiments provide that a customer 608 may wager that he can catch the ball that the receiver could not catch.

In some embodiments, the customer must simply match the motions of the replay, thus accurately mimicking the athletes.

Some embodiments may use computer logic, Artificial Intelligence (AI) and/or Machine Learning (ML) during the replay such that the customer 608 must replay the event using the logic. In such embodiments, the customer 608 may try another outcome and must face the AI alternate outcome. For example, the customer 608 may wager that he could have done better so he replays the outcome. In the present example in which the receiver dropped the ball, the customer 608 may decide to run to a different location to receive a hand-off and run the ball. In this example, the AI system may respond to the customer's actions. In the event that the customer is successful over the AI, then the customer may win by achieving a better outcome than the "play" that the customer 608 is replaying and be awarded money and/or the ability to share his win on social media. For example, the customer 608 may share the result with a message such as "See! They should have run the ball!!!".

Although discussed herein in the context of a VR and/or AR device, some embodiments herein are not so limited. For example, embodiments herein may be implemented without a VR and/or AR and/or motion capture device for the person placing the wagers. In some embodiments, the customer could use a mobile application, personal computer and/or other computer device to manipulate a character to place the wager. For example, the customer may provide inputs to move a 2D or 3D character on their screen and buttons to make the character jump, run, dodge, catch, and/or shoot, among others. The customer then records the motions and activity and places the wager using this input rather than the VR and/or AR and/or motion capture device.

Virtual/Augmented Reality Systems and Viewers

Figure 1:
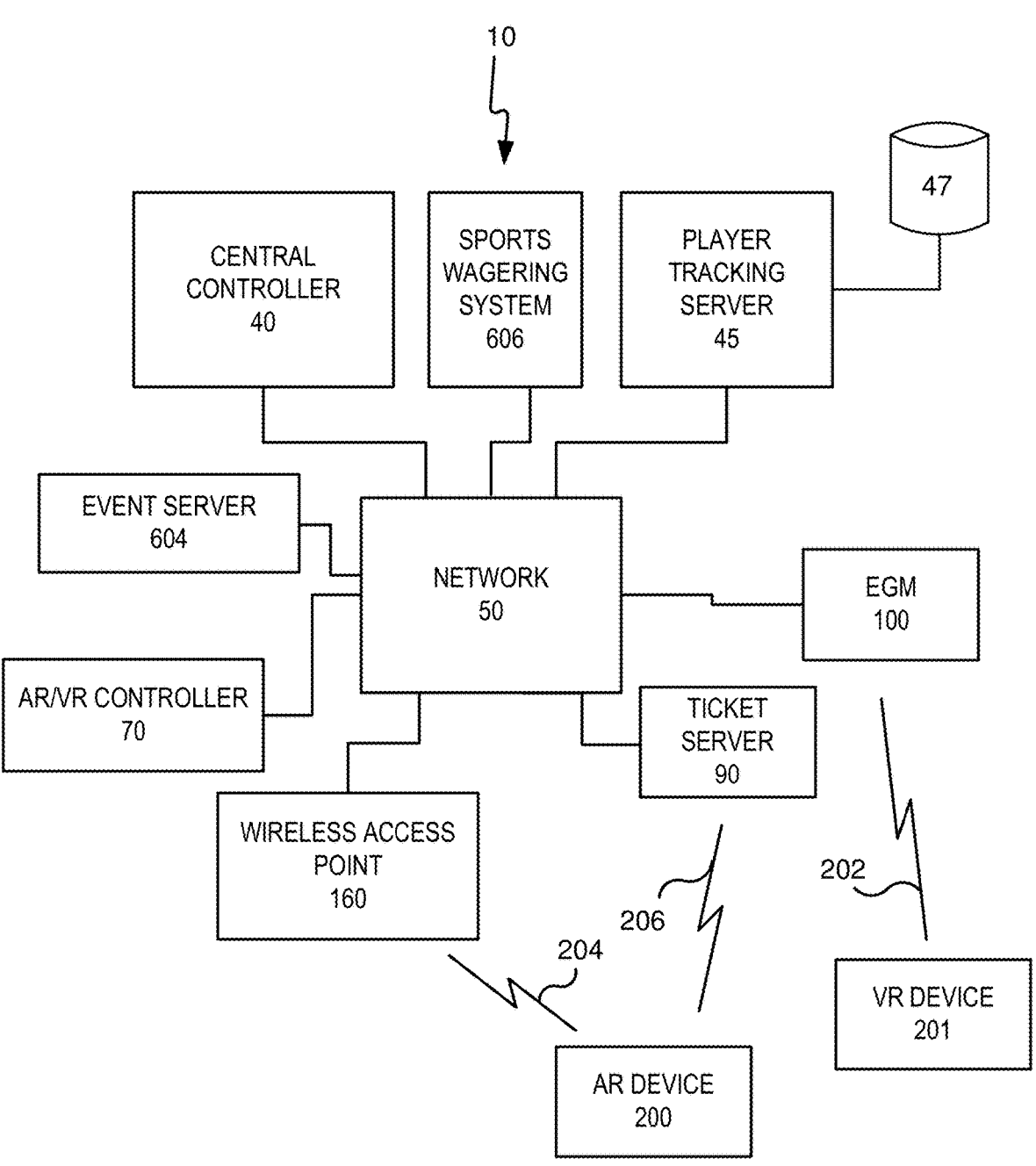
FIG. 1 is a schematic block diagram illustrating a network configuration for a plurality of gaming devices according to some embodiments.

Referring to FIG. 1, a gaming system 10 including a plurality of EGMs 100 is illustrated. As discussed above, the EGMs 100 may be one type of a variety of different types of gaming devices. The gaming system 10 may be located, for example, on the premises of a gaming establishment, such as a casino. The EGMs 100, which are typically situated on a casino floor, may be in communication with each other and/or at least one central controller 40 through a data communication network 50 that may include a remote communication link. The data communication network 50 may be a private data communication network that is operated, for example, by the gaming facility that operates the EGMs 100. Communications over the data communication network 50 may be encrypted for security. The central controller 40 may be any suitable server or computing device which includes at least one processing circuit and at least one memory or storage device. Each EGM 100 may include a processing circuit that transmits and receives events, messages, commands or any other suitable data or signal between the EGM 100 and the central controller 40. The EGM processing circuit is operable to execute such communicated events, messages or commands in conjunction with the operation of the EGM 100. Moreover, the processing circuit of the central controller 40 is configured to transmit and receive events, messages, commands or any other suitable data or signal between the central controller 40 and each of the individual EGMs 100. In some embodiments, one or more of the functions of the central controller 40 may be performed by one or more EGM processing circuits. Moreover, in some embodiments, one or more of the functions of one or more EGM processing circuits as disclosed herein may be performed by the central controller 40.

A wireless access point 160 provides wireless access to the data communication network 50. The wireless access point 160 may be connected to the data communication network 50 as illustrated in FIG. 1 or may be connected directly to the central controller 40 or another server connected to the data communication network 50.

A player tracking server 45 may also be connected through the data communication network 50. The player tracking server 45 may manage a player tracking account that tracks the player's gameplay and spending and/or other player preferences and customizations, manages loyalty awards for the player, manages funds deposited or advanced on behalf of the player, and other functions. Player information managed by the player tracking server 45 may be stored in a player information database 47.

As further illustrated in FIG. 1, the gaming system 10 may include a ticket server 90 that is configured to print and/or dispense wagering tickets. The ticket server 90 may be in communication with the central controller 40 through the data network 50. Each ticket server 90 may include a processing circuit that transmits and receives events, messages, commands or any other suitable data or signal between the ticket server 90 and the central controller 40. The ticket server 90 processing circuit may be operable to execute such communicated events, messages or commands in conjunction with the operation of the ticket server 90. Moreover, in some embodiments, one or more of the functions of one or more ticket server 90 processing circuits as disclosed herein may be performed by the central controller 40.

As further illustrated in FIG. 1, an AR device 200 and a VR device 201 are provided. The VR and/or AR device 201, 200 may communicate with one or more elements of the gaming system 10 to render two-dimensional (2D) and/or three-dimensional (3D) content to a player of one of the EGMs 100, the event server 72, the sports wagering system 73, and/or the ticket server 90 in a virtual space. In the context of the AR device 200, the player may be able to see objects in the real space around the player. That is, the AR device 200 combines a virtual image from AR display content with real images perceived by the user, including images of real objects as well as objects printed on the wagering ticket. In this manner, the AR device 200 "mixes" real and virtual reality into a single viewing experience for the player. In some embodiments, the AR device 200 may be further configured to enable the player to interact with both the real and virtual objects displayed to the player by the AR device 200.

In contrast, the VR device 202 may provide full visual content without including images of real-world objects and/or environments.

The AR device 200 and/or VR device 201 may communicate with one or more elements of the system 10 to coordinate the rendering of images such as mixed reality images in the case of the AR 200. For example, in some embodiments, the AR device 200 may communicate directly with the ticket server 90 over a wireless interface 202, which may be a WiFi link, a Bluetooth link, an NFC link, etc. In other embodiments, the AR device 200 and/or VR device 201 may communicate with the data communication network 50 (and devices connected thereto, including EGMs and the coin pusher) over a wireless interface 204 with the wireless access point 160. The wireless interface 204 may include a WiFi link, a Bluetooth link, an NFC link, etc. In further embodiments, the AR device 200 may communicate simultaneously with both the ticket server 90 over the wireless interface 206 and the wireless access point 160 over the wireless interface 204. Some embodiments provide that AR device 200 may communicate with one or more of the EGMs 100 over a wireless interface 202. In these embodiments, wireless interface 202, wireless interface 204 and wireless interface 206 may use different communication protocols and/or different communication resources, such as different frequencies, time slots, spreading codes, etc. For example, in some embodiments, the wireless interface 202 may be a Bluetooth link, while the wireless interface 204 and/or 206 may be a WiFi link.

The wireless interfaces 202, 204, 206 allow the AR device 200 and/or the VR device 201 to coordinate the generation and rendering of images including mixed reality images to the player via the AR device 200 and/or the VR device.

In some embodiments, the gaming system 10 includes a mixed reality controller, or AR/VR controller 70. The AR/VR controller 70 may be a computing system that communicates through the data communication network 50 with the ticket server 90 and the AR device 200 and/or VR device 201 to coordinate the generation and rendering of virtual images to one or more players using the AR devices 200 and/or VR devices. The VR/AR Controller 70 may be implemented within or separately from the central controller 40.

In some embodiments, the AR/VR controller 70 may coordinate the generation and display of the virtual images of the same virtual object to more than one player by more than one AR device 200 and/or VR device 201. As described in more detail below, this may enable multiple players to interact with the same virtual object together in real time. This feature can be used to provide a shared multiplayer experience to multiple players at the same time.

Moreover, in some embodiments, the AR/VR controller 70 may coordinate the generation and display of the same virtual object to players at different physical locations, as will be described in more detail below.

As discussed above, some embodiments provide that the captured motion and video data may be sent to an event server 604. The event server 604 may analyze the received motion and video capture data. The event server 604 may send this information to a sports wagering system 606. The sports wagering system 606 may distribute the play-by-play information to the customer with VR 608. It also sends the customer the wagering opportunities including the micro wagering opportunities.

Referring to FIGS. 2A to 2E, the AR device 200 and/or VR device 201 may be implemented in a number of different ways. For example, referring to FIG. 2A, in some embodiments, an AR device 200A may be implemented as a 3D headset including a pair of semitransparent lenses 212 on which images of virtual objects may be displayed. In some embodiments, the VR device may be a head-mounted VR headset that includes internal screens and does not mix images with the physical world.

Different stereoscopic images may be displayed on the lenses 212 to create an appearance of depth, while the semitransparent nature of the lenses 212 allows the user to see both the real world as well as the 3D image rendered on the lenses 212. The AR device 200A may be implemented, for example, using a Hololens™ from Microsoft Corporation. The Microsoft Hololens includes a plurality of cameras 234 and other sensors 211 that the device uses to build a 3D model of the space around the user. The device 200A can generate a 3D image to display to the user that takes into account the real-world objects around the user and allows the user to interact with the 3D object.

The device 200A may further include other sensors 232, such as a gyroscopic sensor, a GPS sensor, one or more accelerometers, and/or other sensors that allow the device 200A to determine its position and orientation in space. In further embodiments, the device 200A may include one or more cameras that allow the device 200A to determine its position and/or orientation in space using visual simultaneous localization and mapping (VSLAM). The device 200A may further include one or more microphones and/or speakers 235 that allow the user to interact audially with the device.

Figures 2A, 2B, 2C, 2D:
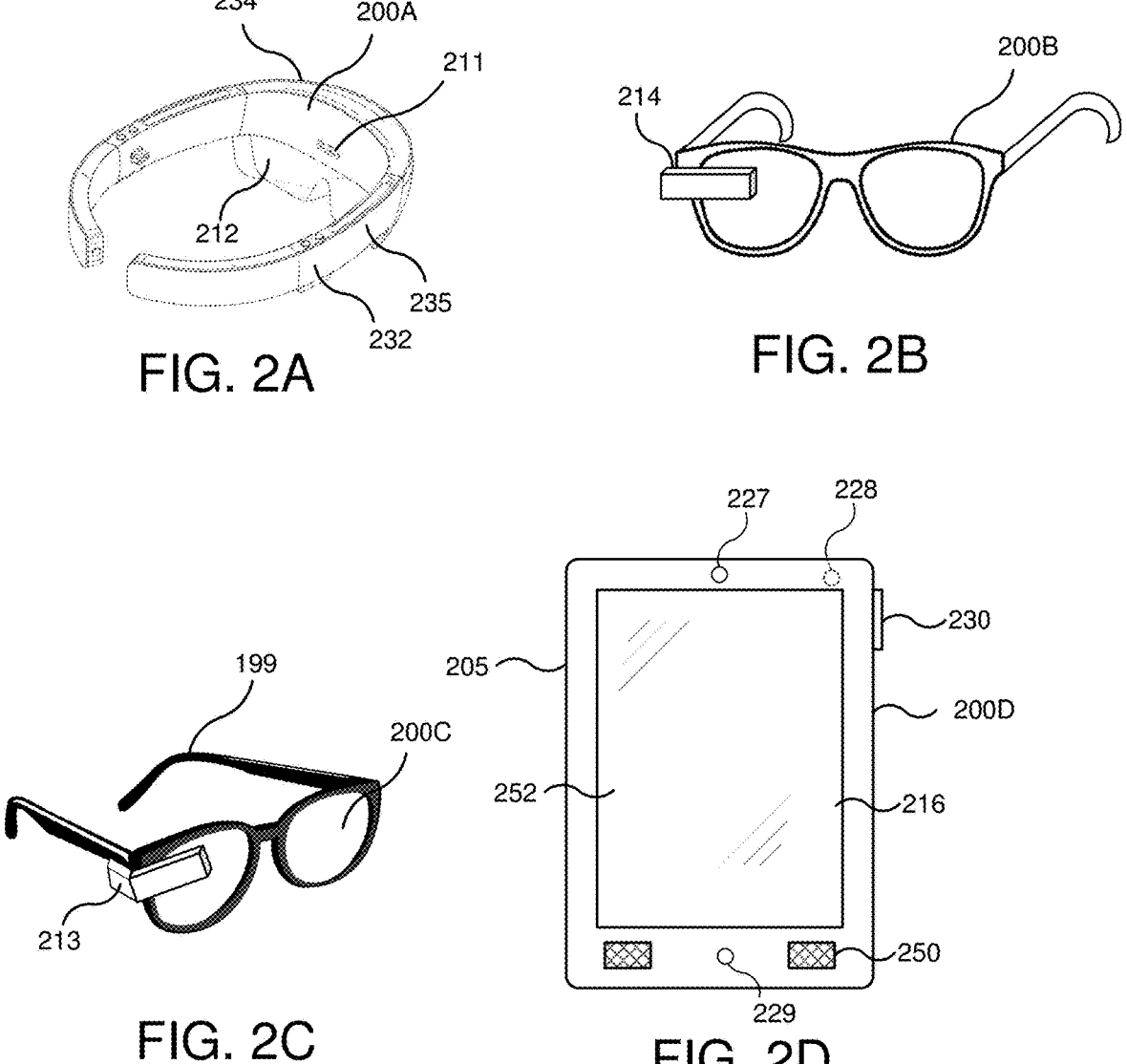
FIGS. 2A to 2E illustrate augmented/virtual reality viewing devices according to various embodiments.

Referring to FIG. 2B, an AR device 200B may be implemented as a pair of glasses 200B including a transparent prismatic display 214 that displays an image to a single eye of the user. An example of such a device is the Google Glass device. Such a device may be capable of displaying images to the user while allowing the user to see the world around the user, and as such can be used as a mixed reality viewer.

In other embodiments, referring to FIG. 2C, the AR device may be implemented using a virtual retinal display device 200C. In contrast to devices that display an image within the field of view of the user, a virtual retinal display 200C may raster scan an image directly onto the retina of the user. In some embodiments, the virtual retinal display 200C may include glasses 199 that may support and/or position virtual retinal display 200C relative to the user's eyes. In some embodiments, the virtual retinal display 200C may be configured to be removably coupled to glasses that are not provided with the virtual retinal display 200C. In such embodiments, the virtual retinal display may be used in conjunction with user supplied glasses 199 that may include lenses for correcting vision impairments. Like the device 200B, the virtual retinal display device 200C combines the displayed image with surrounding light to allow the user to see both the real world and the displayed image. However, also like the device 200B, the virtual retinal display device 200C may be incapable of displaying 3D images to the user.

In still further embodiments, an AR device 200D, as shown in FIG. 2D, may be implemented using a mobile wireless device, such as a mobile telephone, a tablet computing device, a personal digital assistant, or the like. The device 200D may be a handheld device including a housing 205 on which a touchscreen display device 216 including a digitizer 252 is provided. An input button 230 may be provided on the housing and may act as a power or control button. A rear facing camera 227 may be provided in a front face of the housing 205. The device 200D may further include a front facing camera 228 on a rear face of the housing 205. The device 200D may include one or more speakers 250 and a microphone 229. The device 200D may provide a mixed reality display by capturing a video signal using the front facing camera 228 and displaying the video signal on the display device 216, and also displaying a rendered image of a virtual object over the captured video signal. In this manner, the user may see both a mixed image of both a real object in front of the device 200D as well as a virtual object superimposed over the real object to provide a mixed reality viewing experience.

Figure 2E:
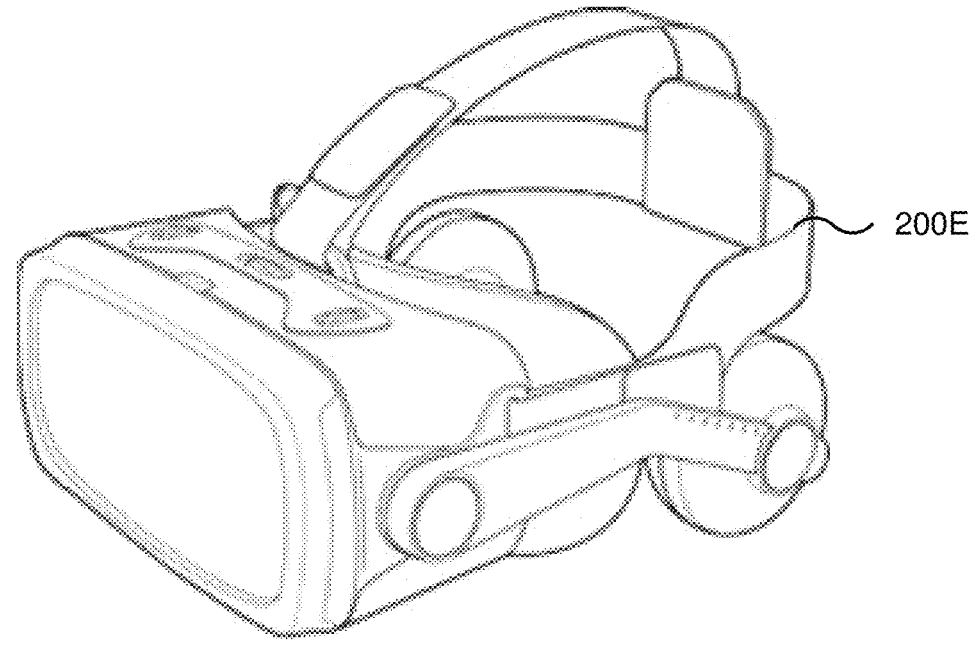

In still further embodiments, an AR device 200E, as shown in FIG. 2E, may be implemented using head mounted display that includes various features described herein including input devices like cameras and microphones as well as hand-held components (not shown here that may be used to provide inputs to the VR device. The device 200E may be a handheld device including a housing on which a touchscreen display device including a digitizer is provided. An input button may be provided on the housing and may act as a power or control button. A rear facing camera may be provided in a front face of the housing. The device 200E may further include a front facing camera on a rear face of the housing. The device 200E may include one or more speakers and a microphone. The device 200E may provide a virtual reality display based on the event server and the sports wagering system and the video signals that are generated on the device 200E.

Figure 2F:
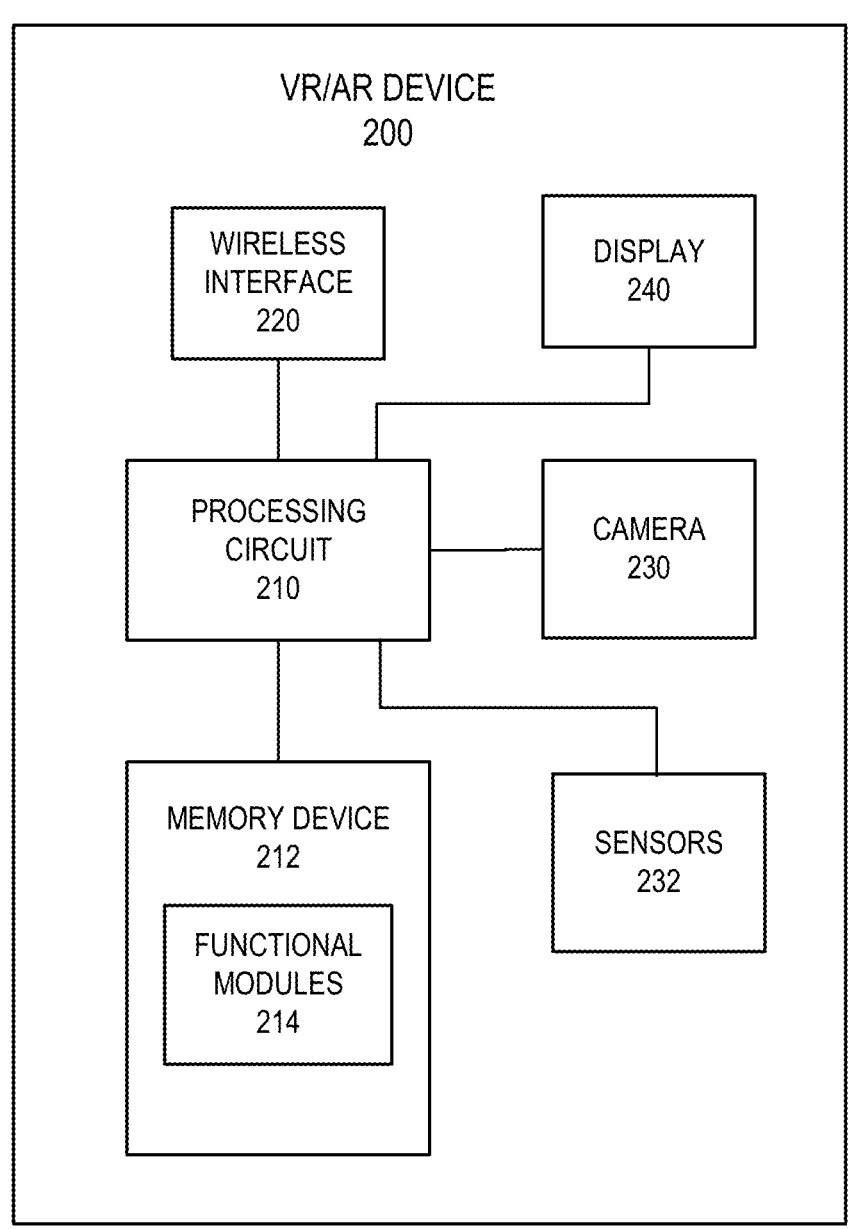
FIG. 2F is a schematic block diagram of an augmented/virtual reality device according to some embodiments.

FIG. 2F is a block diagram that illustrates various components of an VR/AR device 200 according to some embodiments. As shown in FIG. 2F, the VR/AR device 200 may include a processing circuit that controls operations of the VR/AR device 200. Although illustrated as a single processing circuit, multiple special purpose and/or general-purpose processors and/or processor cores may be provided in the VR/AR device 200. For example, the VR/AR device 200 may include one or more of a video processor, a signal processor, a sound processor and/or a communication controller that performs one or more control functions within the VR/AR device 200. The processing circuit 210 may be variously referred to as a "controller," "microcontroller," "microprocessor" or simply a "computer." The processing circuit 210 may further include one or more application-specific integrated circuits (ASICs).

Various components of the VR/AR device 200 are illustrated in FIG. 2F as being connected to the processing circuit 210. It will be appreciated that the components may be connected to the processing circuit 210 through a system bus, a communication bus and controller, such as a USB controller and USB bus, a network interface, or any other suitable type of connection.

The VR/AR device 200 further includes a camera 230 for generating a video signal and a display 240 for displaying AR graphics to a user as virtual images or virtual elements. The AR graphics may be displayed directly within a field of view so as to appear to be present within a scene and/or may be digitally added to a live video signal so as to appear to be present within the live video signal.

The VR/AR device 200 further includes a memory device 212 that stores one or more functional modules 214 for performing the operations described herein.

The memory device 212 may store program code and instructions, executable by the processing circuit 210, to control the VR/AR device 200. The memory device 210 may include random access memory (RAM), which can include volatile and/or non-volatile RAM (NVRAM) and other forms as commonly understood in the gaming industry. In some embodiments, the memory device 212 may include read only memory (ROM). In some embodiments, the memory device 212 may include flash memory and/or EEPROM (electrically erasable programmable read only memory). Any other suitable magnetic, optical and/or semiconductor memory may operate in conjunction with the gaming device disclosed herein.

The VR/AR device 200 may include a wireless interface 220 that enables the AR device 200 to communicate with remote devices, such as EGMs 100 and/or an VR/AR Controller 70 over a wired and/or wireless communication network, such as a local area network (LAN), wide area network (WAN), cellular communication network, wireless LAN (Wifi), Bluetooth, near-field communications (NFC) or other data communication network. The wireless interface 220 may include multiple radios to support multiple types of simultaneous connections. For example, the wireless interface may include both a Wifi radio transceiver and a Bluetooth radio transceiver.

Electronic Gaming Machines

Figure 3A:
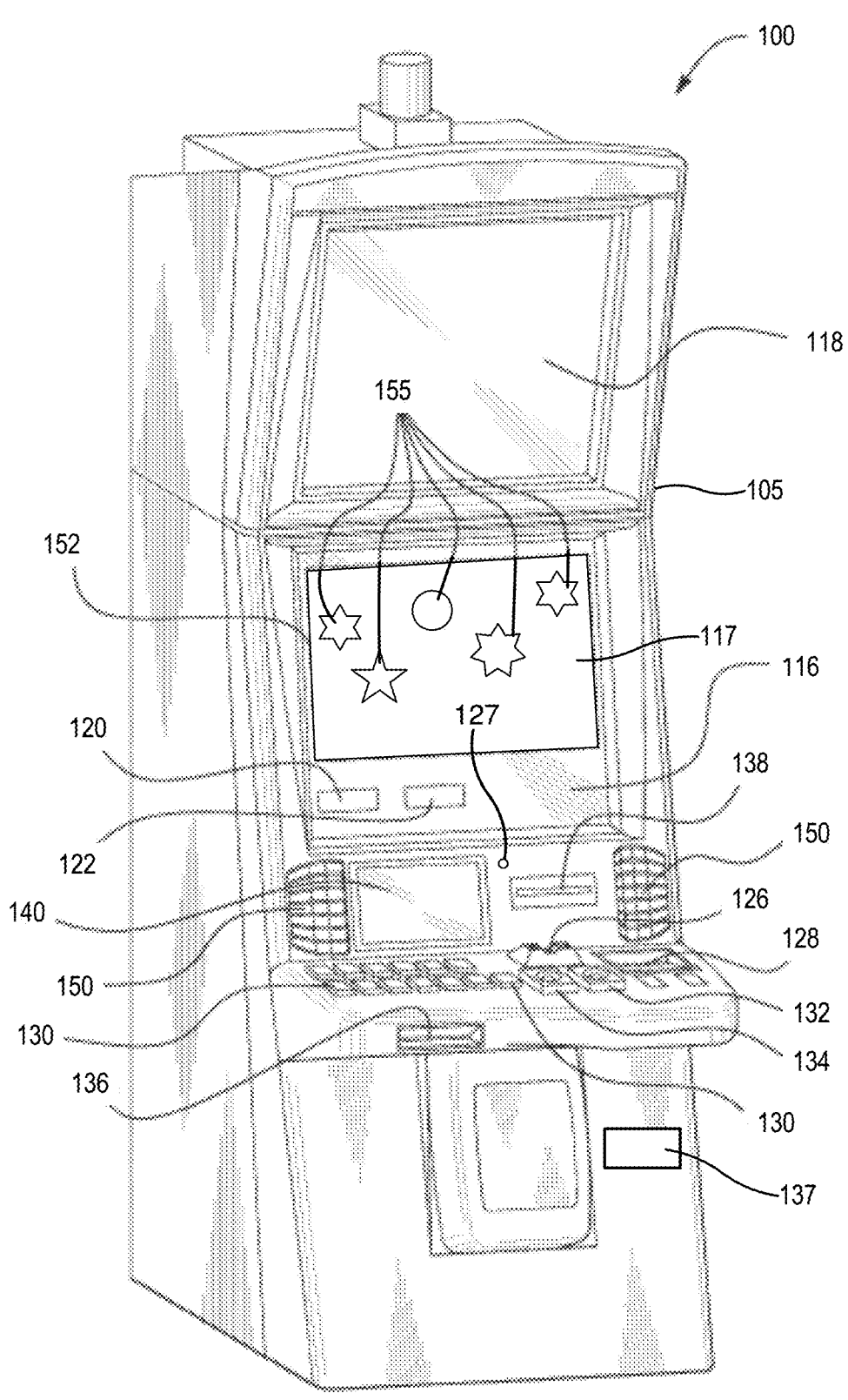
FIG. 3A is a perspective view of a gaming device that can be configured according to some embodiments.
Figure 3B:
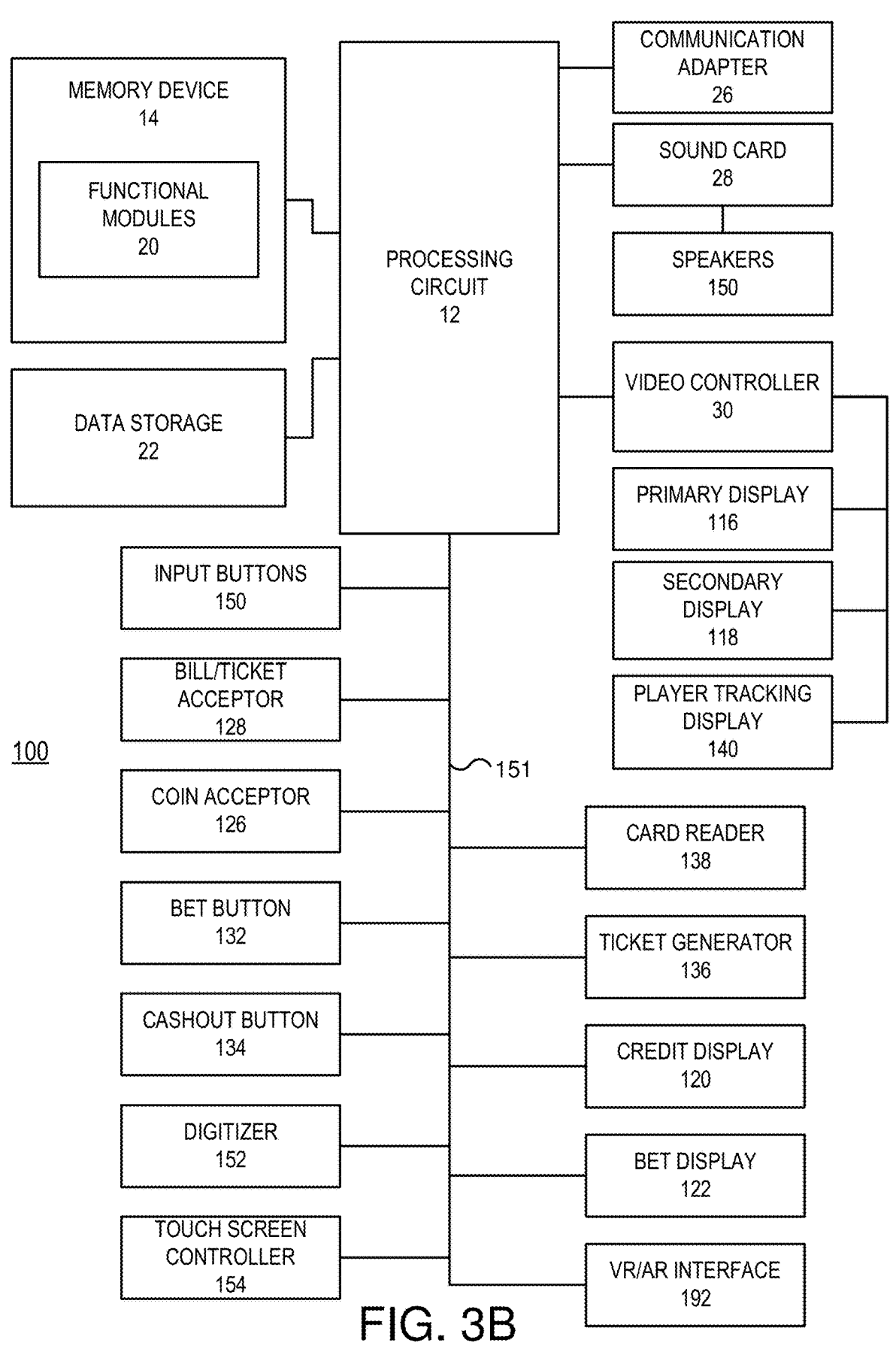
FIG. 3B is a schematic block diagram illustrating an electronic configuration for a gaming device according to some embodiments.
Figure 3C:
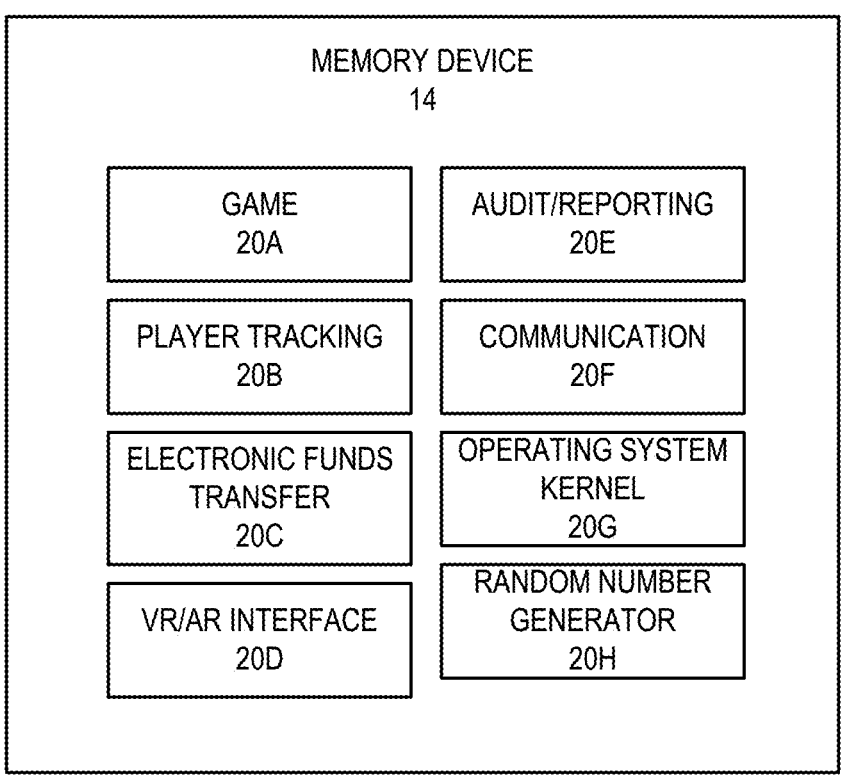
FIG. 3C is a schematic block diagram that illustrates various functional modules of a gaming device according to some embodiments.

Embodiments herein may include different types of gaming devices. One example of a gaming device includes an electronic gaming machine (EGM) 100 that can interact with mixed reality viewers according to various embodiments is illustrated in FIGS. 3A, 3B, and 3C in which FIG. 3A is a perspective view of an EGM 100 illustrating various physical features of the device, FIG. 3B is a functional block diagram that schematically illustrates an electronic relationship of various elements of the EGM 100, and FIG. 3C illustrates various functional modules that can be stored in a memory device of the EGM 100. The embodiments shown in FIGS. 3A to 3C are provided as examples for illustrative purposes only. It will be appreciated that EGMs may come in many different shapes, sizes, layouts, form factors, and configurations, and with varying numbers and types of input and output devices, and that embodiments of the inventive concepts are not limited to the particular EGM structures described herein.

EGMs 100 typically include a number of standard features, many of which are illustrated in FIGS. 3A and 3B. For example, referring to FIG. 3A, an EGM 100 may include a support structure, housing or cabinet 105 which provides support for a plurality of displays, inputs, outputs, controls and other features that enable a player to interact with the EGM 100.

The EGM 100 illustrated in FIG. 3A includes a number of display devices, including a primary display device 116 located in a central portion of the cabinet 105 and a secondary display device 118 located in an upper portion of the cabinet 105. A plurality of game components 155 are displayed on a display screen 117 of the primary display device 116. It will be appreciated that one or more of the display devices 116, 118 may be omitted, or that the display devices 116, 118 may be combined into a single display device. The EGM 100 may further include a player tracking display 140, a credit display 120, and a bet display 122. The credit display 120 displays a player's current number of credits, cash, account balance or the equivalent. The bet display 122 displays a player's amount wagered. Locations of these displays are merely illustrative as any of these displays may be located anywhere on the EGM 100.

The player tracking display 140 may be used to display a service window that allows the player to interact with, for example, their player loyalty account to obtain features, bonuses, comps, etc. In other embodiments, additional display screens may be provided beyond those illustrated in FIG. 3A. In some embodiments, one or more of the player tracking display 140, the credit display 120 and the bet display 122 may be displayed in one or more portions of one or more other displays that display other game related visual content. For example, one or more of the player tracking display 140, the credit display 120 and the bet display 122 may be displayed in a picture in a picture on one or more displays.

The EGM 100 may further include a number of input devices 130 that allow a player to provide various inputs to the EGM 100, either before, during or after a game has been played. For example, the EGM 100 may include input devices 130 that are a plurality of input buttons 130 that allow the player to select options before, during or after game play. The EGM may further include a game play initiation button 132 and a cashout button 134. The cashout button 134 is utilized to receive a cash payment or any other suitable form of payment corresponding to a quantity of remaining credits of a credit display.

In some embodiments, one or more input devices of the EGM 100 are one or more game play activation devices that are each used to initiate a play of a game on the EGM 100 or a sequence of events associated with the EGM 100 following appropriate funding of the EGM 100. The example EGM 100 illustrated in FIGS. 3A and 3B includes a game play activation device in the form of a game play initiation button 132. It should be appreciated that, in other embodiments, the EGM 100 begins game play automatically upon appropriate funding rather than upon utilization of the game play activation device.

In some embodiments, one or more input devices 130 of the EGM 100 are one or more wagering or betting devices. One such wagering or betting device includes a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one.

In some embodiments, one or more of the display screens may a touch-sensitive display that includes a digitizer 152 and a touchscreen controller 154 (FIG. 3B). The player may interact with the EGM 100 by touching virtual buttons on one or more of the display devices 116, 118, 140. Accordingly, any of the above described input devices, such as the input buttons 130, the game play initiation button 132 and/or the cashout button 134 may be provided as virtual buttons on one or more of the display devices 116, 118, 140.

Referring briefly to FIG. 3B, operation of the primary display device 116, the secondary display device 118 and the player tracking display 140 may be controlled by a video controller 30 that receives video data from a processing circuit 12 or directly from a memory device 14 and displays the video data on the display screen. The credit display 120 and the bet display 122 are typically implemented as simple LCD or LED displays that display a number of credits available for wagering and a number of credits being wagered on a particular game. Accordingly, the credit display 120 and the bet display 122 may be driven directly by the processing circuit 12. In some embodiments however, the credit display 120 and/or the bet display 122 may be driven by the video controller 30.

Referring again to FIG. 3A, the display devices 116, 118, 140 may include, without limitation: a cathode ray tube, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display devices 116, 118, 140 may include a touch-screen with an associated touch-screen controller 154 and digitizer 152. The display devices 116, 118, 140 may be of any suitable size, shape, and/or configuration. The display devices 116, 118, 140 may include flat or curved display surfaces.

The display devices 116, 118, 140 and video controller 30 of the EGM 100 are generally configured to display one or more game and/or non-game images, symbols, and indicia. In certain embodiments, the display devices 116, 118, 140 of the EGM 100 are configured to display any suitable visual representation or exhibition of the movement of objects; dynamic lighting; video images; images of people, characters, places, things, and faces of cards; and the like. In certain embodiments, the display devices 116, 118, 140 of the EGM 100 are configured to display one or more virtual reels, one or more virtual wheels, and/or one or more virtual dice. In other embodiments, certain of the displayed images, symbols, and indicia are in mechanical form. That is, in these embodiments, the display device 116, 118, 140 includes any electromechanical device, such as one or more rotatable wheels, one or more reels, and/or one or more dice, configured to display at least one or a plurality of game or other suitable images, symbols, or indicia.

The EGM 100 also includes various features that enable a player to deposit credits in the EGM 100 and withdraw credits from the EGM 100, such as in the form of a payout of winnings, credits, etc. For example, the EGM 100 may include a ticket dispenser 136, a bill/ticket acceptor 128, and a coin acceptor 126 that allows the player to deposit coins into the EGM 100.

As illustrated in FIG. 3A, the EGM 100 may also include a currency dispenser 137 that may include a note dispenser configured to dispense paper currency and/or a coin generator configured to dispense coins or tokens in a coin payout tray.

The EGM 100 may further include one or more speakers 150 controlled by one or more sound cards 28 (FIG. 3B). The EGM 100 illustrated in FIG. 3A includes a pair of speakers 150. In other embodiments, additional speakers, such as surround sound speakers, may be provided within or on the cabinet 105. Moreover, the EGM 100 may include built-in seating with integrated headrest speakers.

In various embodiments, the EGM 100 may generate dynamic sounds coupled with attractive multimedia images displayed on one or more of the display devices 116, 118, 140 to provide an audio-visual representation or to otherwise display full-motion video with sound to attract players to the EGM 100 and/or to engage the player during gameplay. In certain embodiments, the EGM 100 may display a sequence of audio and/or visual attraction messages during idle periods to attract potential players to the EGM 100. The videos may be customized to provide any appropriate information.

The EGM 100 may further include a card reader 138 that is configured to read magnetic stripe cards, such as player loyalty/tracking cards, chip cards, and the like. In some embodiments, a player may insert an identification card into a card reader of the gaming device. In some embodiments, the identification card is a smart card having a programmed microchip or a magnetic strip coded with a player's identification, credit totals (or related data) and other relevant information. In other embodiments, a player may carry a portable device, such as a cell phone, a radio frequency identification tag or any other suitable wireless device, which communicates a player's identification, credit totals (or related data) and other relevant information to the gaming device. In some embodiments, money may be transferred to a gaming device through electronic funds transfer. When a player funds the gaming device, the processing circuit determines the amount of funds entered and displays the corresponding amount on the credit or other suitable display as described above.

In some embodiments, the EGM 100 may include an electronic payout device or module configured to fund an electronically recordable identification card or smart card or a bank or other account via an electronic funds transfer to or from the EGM 100.

FIG. 3B is a block diagram that illustrates logical and functional relationships between various components of an EGM 100. As shown in FIG. 3B, the EGM 100 may include a processing circuit 12 that controls operations of the EGM 100. Although illustrated as a single processing circuit, multiple special purpose and/or general-purpose processors and/or processor cores may be provided in the EGM 100. For example, the EGM 100 may include one or more of a video processor, a signal processor, a sound processor and/or a communication controller that performs one or more control functions within the EGM 100. The processing circuit 12 may be variously referred to as a "controller," "microcontroller," "microprocessor" or simply a "computer." The processor may further include one or more application-specific integrated circuits (ASICs).

Various components of the EGM 100 are illustrated in FIG. 3B as being connected to the processing circuit 12. It will be appreciated that the components may be connected to the processing circuit 12 through a system bus, a communication bus and controller, such as a USB controller and USB bus, a network interface, or any other suitable type of connection.

The EGM 100 further includes a memory device 14 that stores one or more functional modules 20. Various functional modules 20 of the EGM 100 will be described in more detail below in connection with FIG. 3D.

The memory device 14 may store program code and instructions, executable by the processing circuit 12, to control the EGM 100. The memory device 14 may also store other data such as image data, event data, player input data, random or pseudo-random number generators, pay-table data or information and applicable game rules that relate to the play of the gaming device. The memory device 14 may include random access memory (RAM), which can include non-volatile RAM (NVRAM), magnetic RAM (ARAM), ferroelectric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The EGM 100 may further include a data storage device 22, such as a hard disk drive or flash memory. The data storage 22 may store program data, player data, audit trail data or any other type of data. The data storage 22 may include a detachable or removable memory device, including, but not limited to, a suitable cartridge, disk, CD ROM, DVD or USB memory device.

The EGM 100 may include a communication adapter 26 that enables the EGM 100 to communicate with remote devices over a wired and/or wireless communication network, such as a local area network (LAN), wide area network (WAN), cellular communication network, or other data communication network. The communication adapter 26 may further include circuitry for supporting short range wireless communication protocols, such as Bluetooth and/or near field communications (NFC) that enable the EGM 100 to communicate, for example, with a mobile communication device operated by a player.

The EGM 100 may include one or more internal or external communication ports that enable the processing circuit 12 to communicate with and to operate with internal or external peripheral devices, such as eye tracking devices, position tracking devices, cameras, accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumb drives, ticket readers, touch screens, trackballs, touchpads, wheels, and wireless communication devices. In some embodiments, internal or external peripheral devices may communicate with the processing circuit through a universal serial bus (USB) hub (not shown) connected to the processing circuit 12.

In some embodiments, the EGM 100 may include a sensor, such as a camera in communication with the processing circuit 12 (and possibly controlled by the processing circuit 12) that is selectively positioned to acquire an image of a player actively using the EGM 100 and/or the surrounding area of the EGM 100. In one embodiment, the camera may be configured to selectively acquire still or moving (e.g., video) images and may be configured to acquire the images in either an analog, digital or other suitable format. The display devices 116, 118, 140 may be configured to display the image acquired by the camera as well as display the visible manifestation of the game in split screen or picture-in-picture fashion. For example, the camera may acquire an image of the player and the processing circuit 12 may incorporate that image into the primary and/or secondary game as a game image, symbol or indicia.

The VR/AR interface 192 may interact with a VR/AR device 200.

Various functional modules of that may be stored in a memory device 14 of an EGM 100 are illustrated in FIG. 3C. Referring to FIG. 3C, the EGM 100 may include in the memory device 14 a game module 20A that includes program instructions and/or data for operating a hybrid wagering game as described herein. The EGM 100 may further include a player tracking module 20B, an electronic funds transfer module 20C, a wide area progressive module 20D, an audit/reporting module 20E, a communication module 20F, an operating system 20G and a random number generator 20H. The player tracking module 20B keeps track of the play of a player. The electronic funds transfer module 20C communicates with a back end server or financial institution to transfer funds to and from an account associated with the player. The VR/AR interface module 20D interacts with a VR/AR device 200 as described in more detail below. The communication module 20F enables the EGM 100 to communicate with remote servers and other EGMs using various secure communication interfaces. The operating system kernel 20G controls the overall operation of the EGM 100, including the loading and operation of other modules. The random number generator 20H generates random or pseudorandom numbers for use in the operation of the hybrid games described herein.

In some embodiments, an EGM 100 comprises a personal device, such as a desktop computer, a laptop computer, a mobile device, a tablet computer or computing device, a personal digital assistant (PDA), or other portable computing devices. In some embodiments, the EGM 100 may be operable over a wireless network, such as part of a wireless gaming system. In such embodiments, the gaming machine may be a hand-held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission.

Figure 3D:
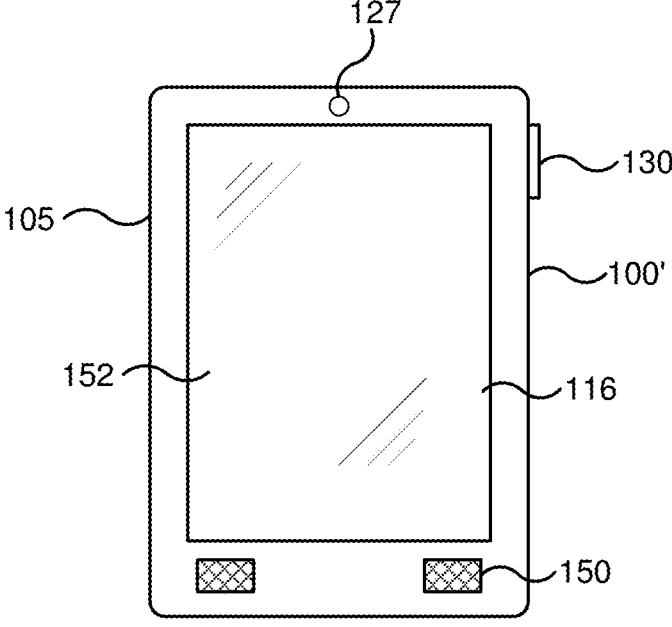
FIG. 3D is a perspective view of a gaming device that can be configured according to some embodiments.

For example, referring to FIG. 3D, an EGM 100' may be implemented as a handheld device including a compact housing 105 on which is mounted a touchscreen display device 116 including a digitizer 152. An input button 130 may be provided on the housing and may act as a power or control button. A camera 127 may be provided in a front face of the housing 105. The housing 105 may include one or more speakers 150. In the EGM 100', various input buttons described above, such as the cashout button, gameplay activation button, etc., may be implemented as soft buttons on the touchscreen display device 116. Moreover, the EGM 100' may omit certain features, such as a bill acceptor, a ticket generator, a coin acceptor or dispenser, a card reader, secondary displays, a bet display, a credit display, etc. Credits can be deposited in or transferred from the EGM 100' electronically.

Figure 3E:
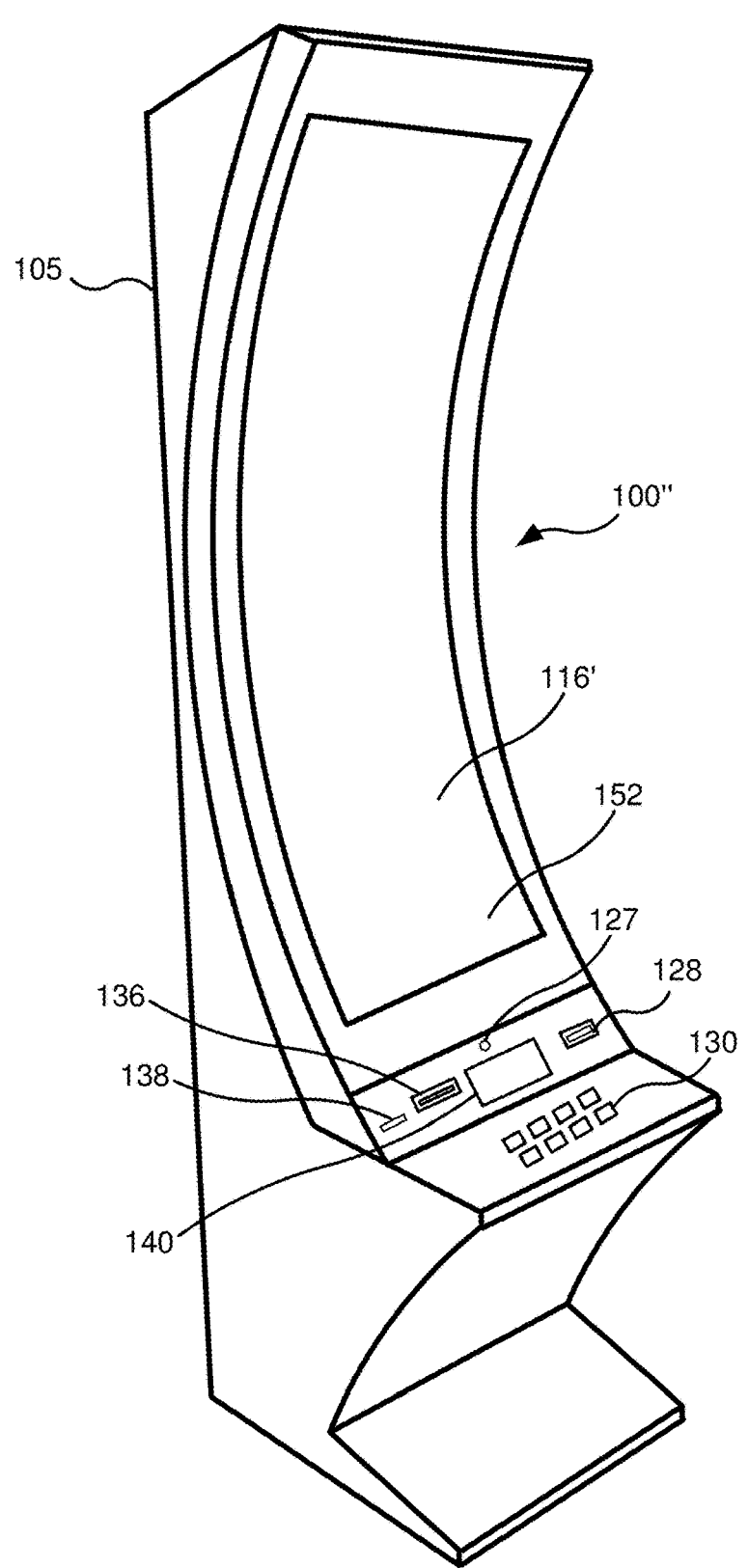
FIG. 3E is a perspective view of a gaming device according to further embodiments.

FIG. 3E illustrates a standalone EGM 100" having a different form factor from the EGM 100 illustrated in FIG. 3A. In particular, the EGM 100" is characterized by having a large, high aspect ratio, curved primary display device 116' provided in the housing 105, with no secondary display device. The primary display device 116' may include a digitizer 152 to allow touchscreen interaction with the primary display device 116'. The EGM 100" may further include a player tracking display 140, a plurality of input buttons 130, a bill/ticket acceptor 128, a card reader 138, and a ticket generator 136. The EGM 100" may further include one or more cameras 127 to enable facial recognition and/or motion tracking.

Although illustrated as EGMs, similar functions and/or operations as described herein may include wagering stations that may include electronic game tables, conventional game tables including those involving cards, dice and/or roulette, and/or other wagering stations such as sports book stations, video poker games, skill-based games, virtual casino-style table games, or other casino or non-casino style games. Further, EGMs according to embodiments herein may be implemented using mobile terminals, such as smart phones, tablets, and/or laptop computers, among others.

AR Controller

Figure 4:
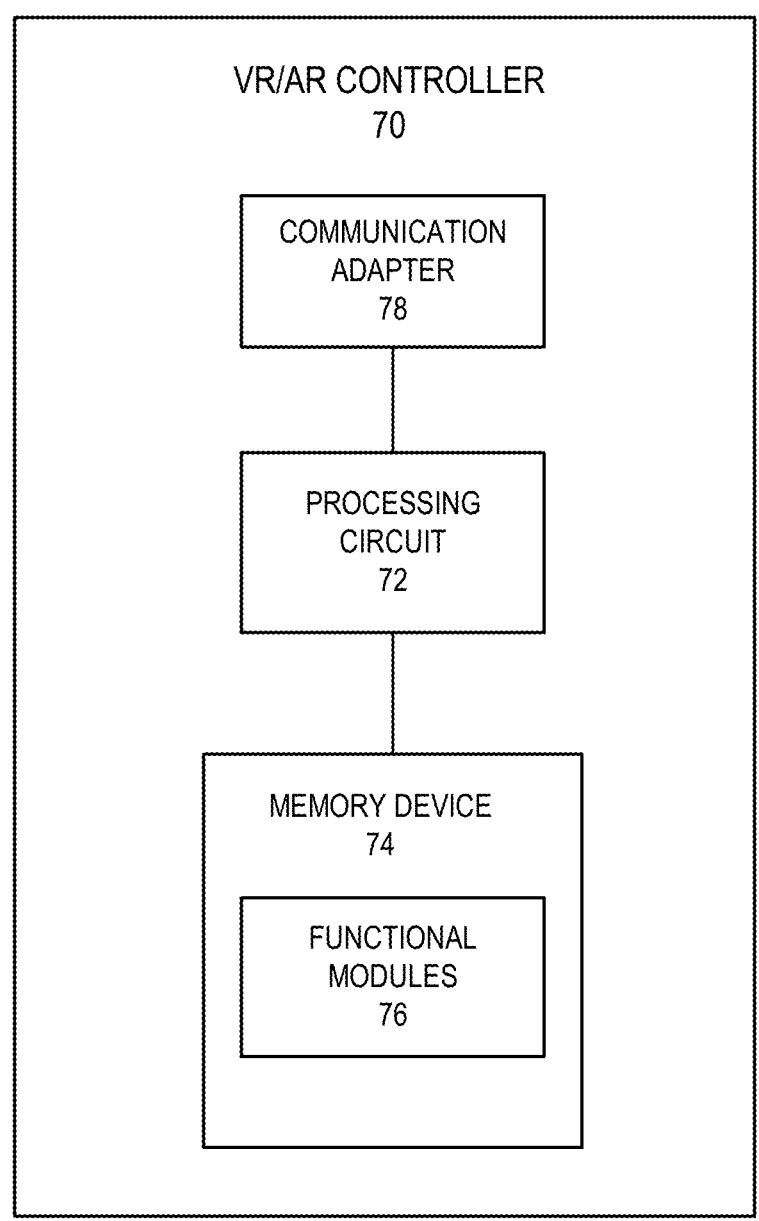
FIG. 4, which is a block diagram that illustrates various components of an VR/AR controller according to some embodiments.

Reference is now made to FIG. 4, which is a block diagram that illustrates various components of an VR/AR Controller 70 according to some embodiments. As shown in FIG. 4, the VR/AR Controller 70 may include a processing circuit 72 that controls operations of the VR/AR Controller 70. Although illustrated as a single processing circuit 72, multiple special purpose and/or general-purpose processors and/or processor cores may be provided in the VR/AR Controller 70. For example, the VR/AR Controller 70 may include one or more of a video processor, a signal processor, a sound processor and/or a communication controller that performs one or more control functions within the VR/AR Controller 70. The processing circuit 72 may be variously referred to as a "controller," "microcontroller," "microprocessor" or simply a "computer." The processing circuit may further include one or more application-specific integrated circuits (ASICs).

Various components of the VR/AR Controller 70 are illustrated in FIG. 4 as being connected to the processing circuit 72. It will be appreciated that the components may be connected to the processing circuit 72 through a system bus, a communication bus and controller, such as a USB controller and USB bus, a network interface, or any other suitable type of connection.

The VR/AR Controller 70 further includes a memory device 74 that stores one or more functional modules 76 for performing the operations described above.

The memory device 74 may store program code and instructions, executable by the processing circuit 72, to control the VR/AR Controller 70. The memory device 74 may include random access memory (RAM), which can include non-volatile RAM (NVRAM), magnetic RAM (MRAM), ferroelectric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The VR/AR Controller 70 may include a communication adapter 78 that enables the VR/AR Controller 70 to communicate with remote devices, such as EGMs 100, coin pusher games 90 and/or a player tracking server 45 (FIG. 1) over a wired and/or wireless communication network, such as a local area network (LAN), wide area network (WAN), cellular communication network, or other data communication network.

The VR/AR Controller 70 may include one or more internal or external communication ports that enable the processing circuit 72 to communicate with and to operate with internal or external peripheral devices, such as display screens, keypads, mass storage devices, microphones, speakers, and wireless communication devices. In some embodiments, internal or external peripheral devices may communicate with the processing circuit 72 through a universal serial bus (USB) hub (not shown) connected to the processing circuit 72.

Other EGM Features

Embodiments described herein may be implemented in various configurations for EGMs 100s, including but not limited to: (1) a dedicated EGM, wherein the computerized instructions for controlling any games (which are provided by the EGM) are provided with the EGM prior to delivery to a gaming establishment; and (2) a changeable EGM, where the computerized instructions for controlling any games (which are provided by the EGM) are downloadable to the EGM through a data network when the EGM is in a gaming establishment. In some embodiments, the computerized instructions for controlling any games are executed by at least one central server, central controller or remote host. In such a "thin client" embodiment, the central server remotely controls any games (or other suitable interfaces) and the EGM is utilized to display such games (or suitable interfaces) and receive one or more inputs or commands from a player. In another embodiment, the computerized instructions for controlling any games are communicated from the central server, central controller or remote host to a EGM local processor and memory devices. In such a "thick client" embodiment, the EGM local processor executes the communicated computerized instructions to control any games (or other suitable interfaces) provided to a player.

In some embodiments, an EGM may be operated by a mobile device, such as a mobile telephone, tablet other mobile computing device. For example, a mobile device may be communicatively coupled to an EGM and may include a user interface that receives user inputs that are received to control the EGM. The user inputs may be received by the EGM via the mobile device.

In some embodiments, one or more EGMs in a gaming system may be thin client EGMs and one or more EGMs in the gaming system may be thick client EGMs. In another embodiment, certain functions of the EGM are implemented in a thin client environment and certain other functions of the EGM are implemented in a thick client environment. In one such embodiment, computerized instructions for controlling any primary games are communicated from the central server to the EGM in a thick client configuration and computerized instructions for controlling any secondary games or bonus functions are executed by a central server in a thin client configuration.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more EGMs; and/or (c) one or more personal EGMs, such as desktop computers, laptop computers, tablet computers or computing devices, personal digital assistants (PDAs), mobile telephones such as smart phones, and other mobile computing devices.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In some embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central controller, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

Embodiments provided herein may provide improved accessibility to wagering stations by including additional user interface technologies, such as virtual and/or augmented reality. Such embodiments may improve technological efficiency by coordinating the augmented reality with examples of different types of wagering stations.

Reference is now made to FIG. 7, which is a flowchart illustrating operations of systems/methods according to some embodiments. Systems may include a communication interface, a processing circuit, and a memory coupled to the processing circuit, the memory comprising machine readable instructions that, when executed by the processing circuit, cause the processing circuit to receive (block 702), from a sporting event server, participant motion data and event data that corresponds to a defined occurrence in a sporting event that is predicted to happen during the sporting event. In some embodiments, the processor is further caused to send (block 704), to a customer device, an event wagering opportunity corresponding to the defined occurrence in the sporting event.

In some embodiments, the processing circuit is caused to receive (block 706), from the customer device and before the defined occurrence in the sporting event, predicted motion data and a wagering amount that corresponds to the event wagering opportunity before the defined occurrence in the sporting event. The processing circuit may be further caused to determine (block 708), after the defined occurrence in the sporting event, an award level that is based on comparing the predicted motion data and an actual outcome of the defined occurrence of the sporting event.

In some embodiments, the customer device includes a virtual reality (VR) device that is configured to receive predicted motion inputs from a customer that correspond to a motion that the customer is wagering will occur in the sporting event. Some embodiments provide that the participant motion data includes leg motion data and arm motion data. Some embodiments provide that the participant motion data and event data are generated in the sporting event server based on multiple sensors that are worn by a participant in the sporting event. In some embodiments, the participant motion data and event data are generated using one or more video cameras.

In some embodiments, the processing circuit is further caused to capture (block 710) event motion data corresponding to non-participant elements in the sporting event. In some embodiments, the non-participant elements include environmental elements and/or equipment that is to be used by a participant in the sporting event. Environmental elements and/or equipment to be used may include a ball, the referees, the conditions of the field, a hockey puck, a baseball ball, gloves, poles, stands, and/or barriers, among others.

In some embodiments, the predicted motion inputs may include actual body movements of the customer and/or a corresponding input provided via a user interface in the VR device. Some embodiments provide that the processing circuit is further caused to send (block 712) play by play sports information to the customer device, for the customer to use in determining a wager.

In some embodiments, the predicted motion data includes a predicted direction, a predicted length of movement and a predicted defined occurrence outcome and the actual outcome of the defined occurrence includes an actual direction, an actual length of movement and an actual defined occurrence outcome.

Some embodiments provide that comparing the predicted motion data and the actual outcome includes comparing the predicted direction with the actual direction, comparing the predicted length of movement with the actual length of movement and comparing the predicted defined occurrence outcome with the actual defined occurrence outcome.

In some embodiments, determining the award level includes assigning a first weight value corresponding to the predicted direction and the actual direction and a second weight value corresponding to the predicted defined occurrence outcome and the actual defined occurrence that is different from the first weight value. In some embodiments, the award level is based on which of the first weighted value and the second weighted value is greater.

Some embodiments include evaluating (block 714) the participant motion data and the predicted motion data to determine a closest match to the actual outcome of the defined occurrence to determine a winner among a plurality of customers. In this manner, multiple customers may play competitively against one another. In some embodiments, the closest match includes a closest final destination and/or a closest position of the customer after the defined occurrence. Some embodiments provide that the closest match is based on a greater time of position corresponding to the predicted motion data of one of the plurality of customers. For example, a customer predicting a path that is close to the actual path for a longer amount of time than another customer may be determined to be a winner over the another customer.

Some embodiments provide that the processing circuit is further configured to receive (block 716) replay predicted motion data to provide the customer with a second attempt to earn the award level.

Brief reference is now made to FIG. 8, which is a flowchart illustrating operations of systems/methods including a sporting event server according to some embodiments. A system includes a communication interface, a processing circuit and a memory coupled to the processing circuit, the memory comprising machine readable instructions that, when executed by the processing circuit, cause the processing circuit to perform operations including comparing (block 802) participant motion data and predicted motion data corresponding to event data that corresponds to a defined occurrence in a sporting event. Operations may further include determining (block 804), after the defined occurrence in the sporting event, an award level that is based on comparing the predicted motion and an actual outcome of the defined occurrence of the sporting event. In some embodiments, the participant motion data and event data are generated in a sporting event server based on multiple of sensors that are worn by a participant in the sporting event.

Further Definitions and Embodiments

In the above-description of various embodiments, various aspects may be illustrated and described herein in any of a number of patentable classes or contexts including any new and useful process, machine, manufacture, or composition of matter, or any new and useful improvement thereof. Accordingly, various embodiments described herein may be implemented entirely by hardware, entirely by software (including firmware, resident software, micro-code, etc.) or by combining software and hardware implementation that may all generally be referred to herein as a "circuit," "module," "component," or "system." Furthermore, various embodiments described herein may take the form of a computer program product comprising one or more computer readable media having computer readable program code embodied thereon.

Any combination of one or more computer readable media may be used. The computer readable media may be a computer readable signal medium or a non-transitory computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (Saas).

Various embodiments were described herein with reference to flowchart illustrations and/or block diagrams of methods, apparatus (systems), devices and computer program products according to various embodiments described herein. It will be understood that each block of the flowchart illustrations and/or block diagrams, and combinations of blocks in the flowchart illustrations and/or block diagrams, can be implemented by computer program instructions. These computer program instructions may be provided to a processing circuit of a general purpose computer, special purpose computer, or other programmable data processing apparatus to produce a machine, such that the instructions, which execute via the processing circuit of the computer or other programmable instruction execution apparatus, create a mechanism for implementing the functions/acts specified in the flowchart and/or block diagram block or blocks.

These computer program instructions may also be stored in a non-transitory computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. A system comprising:
a communication interface;
a processing circuit; and
a memory coupled to the processing circuit, the memory comprising machine readable instructions that, when executed by the processing circuit, cause the processing circuit to:
receive, from a sporting event server, participant motion data and event data that corresponds to a defined occurrence in a sporting event that is predicted to happen during the sporting event, wherein the defined occurrence comprises an action to be performed by a participant during the sporting event, wherein the participant motion data and event data are generated in the sporting event server based on a plurality of sensors that are worn by the participant in the sporting event;

send, to a customer device, an event wagering opportunity corresponding to the defined occurrence in the sporting event;

receive, from the customer device and before the defined occurrence in the sporting event, predicted motion data and a wagering amount that corresponds to the event wagering opportunity before the defined occurrence in the sporting event; and determine, after the defined occurrence in the sporting event, an award level that is based on comparing the predicted motion data and an actual outcome of the defined occurrence of the sporting event.

2. The system of claim 1, wherein the customer device comprises a virtual reality (VR) device that is configured to receive predicted motion inputs from a customer that correspond to a motion that the customer is wagering will occur in the sporting event.

3. The system of claim 2, wherein the participant motion data comprises leg motion data and arm motion data.

4. The system of claim 2, wherein the participant motion data and event data are generated using video cameras.

5. The system of claim 2 wherein the processing circuit is further caused to capture event motion data corresponding to non-participant elements in the sporting event.

6. The system of claim 5, wherein the non-participant elements comprise environmental elements and equipment that is to be used by a participant in the sporting event.

7. The system of claim 2, wherein the predicted motion inputs comprise actual body movements of the customer and a corresponding input provided via a user interface in the VR device.

8. The system of claim 7, wherein the processing circuit is further caused to send play by play sports information to the customer device, for the customer to use in determining a wager.

9. The system of claim 2, wherein the predicted motion data comprises a predicted direction, a predicted length of movement and a predicted defined occurrence outcome, and wherein the actual outcome of the defined occurrence comprises an actual direction, an actual length of movement and an actual defined occurrence outcome.

10. The system of claim 9, wherein comparing the predicted motion data and the actual outcome comprises:

comparing the predicted direction with the actual direction;

comparing the predicted length of movement with the actual length of movement; and comparing the predicted defined occurrence outcome with the actual defined occurrence outcome.

11. The system of claim 10, wherein determining the award level comprises assigning a first weight value corresponding to the predicted direction and the actual direction and a second weight value corresponding to the predicted defined occurrence outcome and the actual defined occurrence that is different from the first weight value.

12. The system of claim 11, wherein the award level is based on which of the first weight value and the second weight value is greater.

13. The system of claim 10, further comprising evaluating the participant motion data and the predicted motion data to determine a closest match to the actual outcome of the defined occurrence to determine a winner among a plurality of customers.

14. The system of claim 13, wherein the closest match comprises a closest final destination and/or a closest position of the customer after the defined occurrence.

15. The system of claim 13, wherein the closest match is based on a greater time of position corresponding to the predicted motion data of one of the plurality of customers.

16. The system of claim 2, wherein the processing circuit is further configured to:

receive replay predicted motion data to provide the customer with a second attempt to earn the award level.

17. A method comprising:

receiving, from a sporting event server, participant motion data and event data that corresponds to a defined occurrence in a sporting event that is predicted to happen during the sporting event, wherein the defined occurrence comprises an action to be performed by a participant during the sporting event, wherein the participant motion data and event data are generated in the sporting event server based on a plurality of sensors that are worn by the participant in the sporting event;

sending, to a customer device, an event wagering opportunity corresponding to defined occurrence in the sporting event;

receiving, from the customer device and before the defined occurrence in the sporting event, predicted motion data and a wagering amount that corresponds to the event wagering opportunity before the defined occurrence in the sporting event;

determining, after the defined occurrence in the sporting event, an award level that is based on comparing the predicted motion data and an actual outcome of the defined occurrence of the sporting event, wherein the predicted motion data comprises actual body movements of a customer and a corresponding input provided via a user interface; and sending play by play sports information to the customer device for the customer to use in determining a wager.

18. The method of claim 17, wherein the predicted motion data comprises a predicted direction, a predicted length of movement and a predicted defined occurrence outcome, and wherein the actual outcome of the defined occurrence comprises an actual direction, an actual length of movement and an actual defined occurrence outcome, and wherein comparing the predicted motion data and the actual outcome comprises:

comparing the predicted direction with the actual direction;

comparing the predicted length of movement with the actual length of movement; and comparing the predicted defined occurrence outcome with the actual defined occurrence.

19. A system comprising:

a communication interface;

a processing circuit; and a memory coupled to the processing circuit, the memory comprising machine readable instructions that, when executed by the processing circuit, cause the processing circuit to:

compare participant motion data and predicted motion data corresponding to event data that corresponds to a defined occurrence in a sporting event, wherein the defined occurrence comprises an action to be performed by a participant during the sporting event; and determine, after the defined occurrence in the sporting event, an award level that is based on comparing the predicted motion and an actual outcome of the defined occurrence of the sporting event, wherein the participant motion data and event data are generated in a sporting event server based on a plurality of sensors that are worn by the participant in the sporting event.

* * * * *